March 27, 1928.
J. VAUGHAN-SHERRIN
1,663,741
SECONDARY BATTERY
Filed Aug. 4, 1926
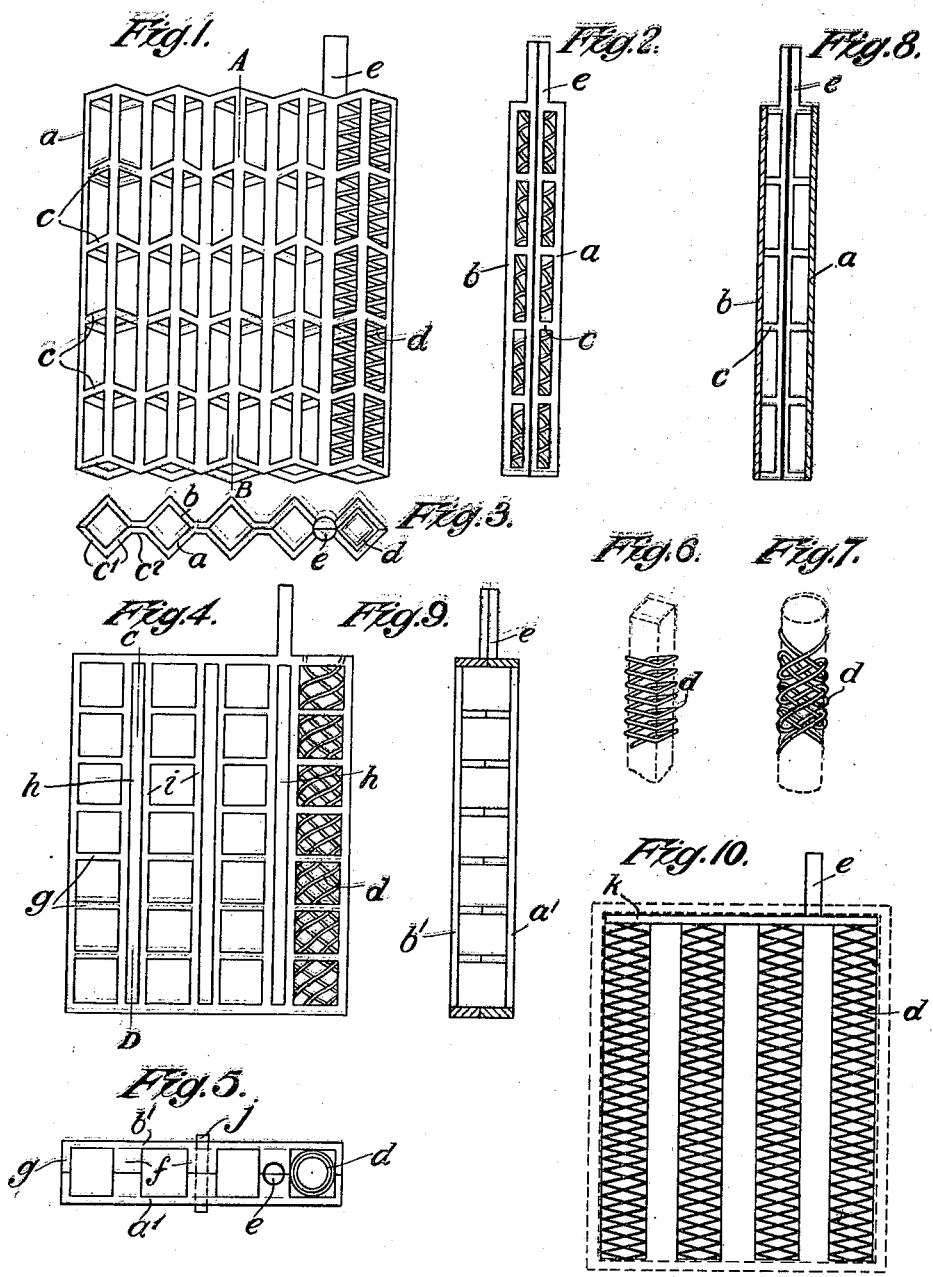
INVENTOR
JOHN VAUGHAN-SHERRIN
PER — Rayner rb
ATTORNEYS Patented Mar. 27, 1928.

1,663,741

UNITED STATES PATENT OFFICE.

JOHN VAUGHAN-SHERRIN, OF RUCKINGE, ENGLAND.

SECONDARY BATTERY.

Application filed August 4, 1926, Serial No. 127,024, and in Great Britain August 13, 1925.

This invention relates to plates for secondary cells or accumulators and has for its object to obviate loss of capacity in plates due to the expansion of the paste in the grid or frame of the plate. When the cell or accumulator is being charged certain internal stresses are set up in the paste which results in an expansion due to the generation of heat, with a consequent expansion of the grid or frame. The subsequent contraction of the paste is not however counteracted by a corresponding contraction of the plate or grid, so that the paste is not packed so tightly in the frame or grid as before the expansion, which results in an imperfect contact between the active material and the conductor.

According to the present invention the conductors for plates for secondary cells or accumulators are constructed and arranged so that they will readily conform to any expansion or contaction of the active material.

The conductors are shaped so that they will readily "give" under any slight pressure or expansion set up by a change in temperature of the active material, and this can be effected by forming each conductor of a flexible wire twisted into a configuration which will easily respond to slight forces.

In the preferred embodiment of this invention the conductors are accommodated in compartments or cages in the grid or frame of a plate, each conductor being in the form of easily flexible wire coiled, formed zig-zag or other configuration which will enable the conductor to readily flex in several directions.

The plate grids or frames are preferably each obtained by placing a pair of symmetrical grid-like members against each other so that spaces are provided between them for the accommodation of the resilient conductors, these conductors preferably being arranged between the two members before joining the two members. Sufficient clearance is provided for the conductors to allow them to move easily in their respective compartments.

Embodiments of my invention will be described with reference to the accompanying sheet of drawings in which:—

Fig. 1 is a perspective elevational view of a grid showing a flexible conductor in position.

Fig. 2 is an elevational end view of Fig. 1.

Fig. 3 is a plan view of Fig. 1.

Fig. 4 is an elevation of a modified form of grid, showing a modified form of flexible conductor in position.

Fig. 5 is a plan view of Fig. 4.

Fig. 6 shows the conductor employed in the grid shown in Fig. 1, the former being indicated by dotted lines.

Fig. 7 shows the conductor employed in the grid shown in Fig. 4, the former being indicated by dotted lines.

Fig. 8 is a sectional end view on the line A—B of Fig. 1.

Fig. 9 is a sectional end view on the line C—D of Fig. 4, and

Fig. 10 is a view illustrating a suitable method of mounting a conducting bar in a dielectric grid or frame of a plate.

Referring to the drawings the grid illustrated in Figs. 1, 2, 3 and 8 is composed of two symmetrical cage-like frames $a$ and $b$ in which the horizontal strips $c$ are arranged in a zig-zag manner, each pair of limbs $c^1$ being joined to the adjacent pairs by narrow straight portions $c^2$ arranged in a common plane on each frame $a$ and $b$. The grid is completed by engaging the portions $c^2$ and uniting them by rivets, screws, binding, fusing or other suitable method.

Before this union of the two parts $a$ and $b$ a number of coiled sinuous or otherwise resiliently formed flexible conductors $d$ are interposed between the two parts $a$ and $b$, each conductor $d$ being accommodated within one of the cage-like compartments provided by the V-shaped parts $c^1$. The conductors $d$ have a slight freedom of movement between the parts $a$ and $b$ and the paste is applied under pressure so as to fill in all of the spaces of the grid and to firmly embed the resilient conductors $d$. One or both of the parts $a$ and $b$ may be formed with a terminal $e$.

It will be appreciated that the configuration of the parts $a$ and $b$ may be modified appreciably. A different configuration is shown in Figs. 4, 5 and 9 in which the grid is of rectilinear configuration, the grid being composed of two like parts $a^1$ and $b^1$ united to each other by the engagement of symmetrically arranged lugs $f$ extending inwards from the upper and lower edges of the parts $a^1$ and $b^1$. The ends of the horizontal strips $g$ are turned inwards and engage with each other.

The individual compartments for the resilient conductors $d$ are obtained by introducing detachable distance pieces into vertical slots $h$ in the vertical strips $i$ of the members $a^1$ and $b^1$. One of these distance pieces is shown in position in Fig. 5 and is indicated by the reference $j$.

After the paste has become set and hard the separating strips $j$ may be withdrawn. If desired the strips $j$ may be composed of easily fusible metal which can be melted out.

The resilient conductors are united at their ends to the grid, except when the grid is composed of a dielectric material, in which case a conducting bar common to all of the resilient conductors $d$ may be provided. An example is shown by Fig. 10 in which an L-shaped conducting bar $k$ has connected to its longer limb the upper ends of the resilient conductors $d$, the other limb serving as a terminal.

If desired the resilient conductors $d$ may be treated by coating or otherwise, to render them indestructible by the electrolyte should it reach the conductors.

It will be realized that the conductors $d$ act as reinforcing agents for the active material, and that each plate is composed of a number of separate rod-like portions of active material firmly held in position by a cage-like structure which provides a large surface area for direct contact with the electrolyte with a consequent lowering of the internal resistance.

I claim:—

1. A plate for secondary batteries or accumulators comprising a grid or frame composed of a number of compartments each charged with active material having incorporated with it a resilient expansible conductor, each conductor being a length of wire wound in a sinuous manner.

2. A plate for secondary batteries or accumulators comprising a grid or frame composed of a number of compartments each charged with active material having incorporated with it a resilient expansible conductor, the said expansible conductors being connected to a common conductor for having a terminal.

3. A plate for secondary batteries comprising a two part frame forming a plurality of box-like chambers having perforated sides, resilient wire coils in said chambers forming conductors, and active material filling said chambers and enclosing conductors.

4. A plate for secondary batteries comprising a two part frame forming a plurality of box-like chambers having perforated sides, resilient wire units in said chambers forming conductors, and active material filling said chambers and enclosing conductors.

5. A plate for secondary batteries comprising in combination a pair of frame plates of channelled form clamped together so that their channels form together a series of box-like chambers, the sides of said channels having openings, spring-like compressible metal conductor units within said chambers and active materials enclosing said units and filling said chambers.

JOHN VAUGHAN-SHERRIN.